(12) United States Patent
Davis et al.

(10) Patent No.: US 8,438,291 B2
(45) Date of Patent: *May 7, 2013

(54) MANAGING WEB TIER SESSION STATE OBJECTS IN A CONTENT DELIVERY NETWORK (CDN)

(75) Inventors: Andrew T. Davis, San Francisco, CA (US); Jay G. Parikh, Redwood City, CA (US); Srikanth Thirumalai, West Newton, MA (US); William E. Weihl, San Francisco, CA (US); Mark Tsimelzon, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/843,278

(22) Filed: Jul. 26, 2010

(65) Prior Publication Data

US 2010/0293281 A1 Nov. 18, 2010

Related U.S. Application Data

(63) Continuation of application No. 11/834,042, filed on Aug. 6, 2007, now Pat. No. 7,765,304, which is a continuation of application No. 10/384,824, filed on Mar. 10, 2003, now Pat. No. 7,254, 634.

(60) Provisional application No. 60/363,014, filed on Mar. 8, 2002.

(51) Int. Cl.
*G06F 15/16* (2006.01)
*G06F 15/177* (2006.01)
*G06F 15/173* (2006.01)

(52) U.S. Cl.
USPC ........... 709/227; 709/223; 709/224; 709/226; 709/221

(58) Field of Classification Search ................... 709/221, 709/223, 224, 226, 227, 228, 217, 238, 249
See application file for complete search history.

(56) References Cited

U.S. PATENT DOCUMENTS 7,228,349 B2 6/2007 Barone, Jr.

*Primary Examiner* — Asad Nawaz
*Assistant Examiner* — Stephanie Chang
(74) *Attorney, Agent, or Firm* — David H. Judson

(57) ABSTRACT

Business applications running on a content delivery network (CDN) having a distributed application framework can create, access and modify state for each client. Over time, a single client may desire to access a given application on different CDN edge servers within the same region and even across different regions. Each time, the application may need to access the latest "state" of the client even if the state was last modified by an application on a different server. A difficulty arises when a process or a machine that last modified the state dies or is temporarily or permanently unavailable. The present invention provides techniques for migrating session state data across CDN servers in a manner transparent to the user. A distributed application thus can access a latest "state" of a client even if the state was last modified by an application instance executing on a different CDN server, including a nearby (in-region) or a remote (out-of-region) server.

10 Claims, 3 Drawing Sheets

FIG. 1

MANAGING WEB TIER SESSION STATE OBJECTS IN A CONTENT DELIVERY NETWORK (CDN)

This application is a continuation of Ser. No. 11/834,042, filed Aug. 6, 2007, now U.S. Pat. No. 7,765,304, which application was a continuation of Ser. No. 10/384,824, filed Mar. 10, 2003, now U.S. Pat. No. 7,254,634, which application was based on and claimed priority from Ser. No. 60/363,014, filed Mar. 8, 2002.

BACKGROUND OF THE INVENTION

1. Technical Field

The present invention relates generally to execution of Web-based applications in a content delivery network.

2. Description of the Related Art

Enterprises can expand their business, increase efficiency, and enable new revenue streams by extending their business applications over the Internet to customers, partners, and suppliers. One way to enable enterprises to shift the operational burden of running a reliable and secure Web presence is to outsource that presence, in whole or in part, to a service provider, such as a content delivery network (CDN). A content delivery network is a collection of content servers and associated control mechanisms that offload work from Web site origin servers by delivering content (e.g., Web objects, streaming media, HTML and executable code) on their behalf to end users. Typically, the content servers are located at the "edge" of the Internet. A well-managed CDN achieves this goal by serving some or all of the contents of a site's Web pages, thereby reducing the customer's infrastructure costs while enhancing an end user's browsing experience from the site. In operation, the CDN uses a request routing mechanism to locate a CDN edge server electronically close to the client to serve a request directed to the CDN. Sites that use a CDN benefit from the scalability, superior performance, and availability of the CDN service provider's outsourced infrastructure.

Many enterprises, such as those that outsource their content delivery requirements, also implement their business services as multi-tier (n-tier) applications. In a representative n-tiered application, Web-based technologies are used as an outer (a first or "presentation") tier to interface users to the application, and one or more other tiers comprise middleware that provides the core business logic and/or that integrates the application with existing enterprise information systems. The Java 2 Platform, Enterprise Edition (J2EE™) is a technology and an associated component-based model that reduces the cost and complexity of developing such multi-tier, enterprise services. The J2EE runtime environment defines several types of application components that can be used to build services. These include (a) Web tier components (e.g., servlets, JSP pages, Java beans, filters, and web event listeners), which are components that typically execute in a web server and respond to HTTP requests from web clients, and (b) Enterprise tier components (e.g., session beans, entity beans and message driven beans, which may be developed as Enterprise JavaBeans™ (EJB™)), that include the business logic and that execute in a managed environment to support transactions. Runtime support for J2EE application components are provided by so-called "containers," with a Web container supporting the Web tier components, and an Enterprise container supporting the Enterprise tier components. Containers execute the application components and provide utility services. J2EE-compliant servers provide deployment, management and execution support for conforming application components.

Provisioning server-side Java applications or application components to run on CDN edge servers presents complex deployment and operational issues. A solution is described in commonly-owned, copending application Ser. No. 10/340,206, filed Jan. 11, 2003, titled "Java Application Framework For Use In A Content Delivery Network." According to that document, given edge servers in the CDN are provisioned with application server code used to execute Web tier components of an application (an "edge-enabled application"). Business applications running on the CDN using this framework can create, access and modify state for each client. Over time, a single client may access a given application on different CDN edge servers within the same region and even across different regions. Each time, the application may need to access the latest "state" of the client even if the state was last modified by an application on a different server. The difficulty arises when a process or a machine that last modified the state dies or is temporarily or permanently unavailable. Thus, an important problem that needs to be solved in the context of a CDN in which an application framework is supported is the management of user session state.

As is well-known, components in the web-tier of an enterprise application, such as servlets, typically store user session state in objects. These objects are stored in the web-tier container. Throughout a user session, the state of the session is made available to all servlets within the web-tier container, e.g., through a mechanism such as a map (hash) lookup. While this scheme may work for single process web containers, it cannot be scaled to work within a CDN, where an end user may be mapped, within the same session, to a set of servers within the CDN region or across one or more regions.

The present invention provides several solutions to address this problem.

SUMMARY OF THE INVENTION

An object of this invention is to provide techniques for management of user session state across servers in a content delivery network (CDN), where the CDN supports a distributed application framework for execution of applications and application components.

A more specific object of this invention is to provide a mechanism by which runtime containers within a content delivery network share session state information with each other and present an end user directed to the CDN with a consistent and high-performance browsing experience.

It is a further object of the present invention to address the problem of migrating a session state within a CDN in a manner transparent to the end user.

Another object of the invention is to enable an end user client to obtain access to a given application on different CDN edge servers while preserving a session state.

A still further object of the invention is to enable a distributed application to access a latest "state" of a client even if the state was last modified by an application instance executing on a different CDN server, including a nearby (in-region) or a remote (out-of-region) server.

It is another more general object of the present invention to enable business applications running on a content delivery network to create, to access and to modify state for each client that is connected to the application.

According to a first embodiment of the invention, a unique CDN-aware session identifier is created and stored in the web-tier container of the machine to which a user is first mapped by the CDN, and ownership of the session state object migrates to the web-tier container on the machine where the user is then currently mapped. The CDN-aware Session Id preferably has three parts—a region number, a session object version number (called a logical time stamp) and a usual SId. The region number represents the region where the user is currently being served from. The version number or logical time stamp preferably is incremented every time the state of the user session is updated. In this embodiment, a given edge server in the region includes a session cache and a simple replication mechanism. If, during a session a user is mapped to a second machine and that machine does not have the session state object in its cache, the session state object is made available to the second machine, which then owns (i.e., maintains control over) the object going forward. Where machines are co-located in the same region, the second machine can obtain the session state object by issuing a broadcast message on a backend network. As an optimization, the current owner of a session state object broadcasts updates to the state object over the backend network so that all servers in the region have the object in their web-tier container cache.

The above-described embodiment is generally implemented within region, i.e., to replicate a session state object to the web-tier containers within edge servers in a particular CDN region. In an alternative embodiment, a session state object is replicated to other regions. In particular, rather than having only one region (the region where the user is mapped initially) store the session state, the session state is replicated to a set of regions. When the user gets mapped to some other region, the container in that region now has a redundant set of regions from which to obtain the session state. Preferably, when the session state object changes, the web-tier container owning the session state object sends a message to a set of replica regions informing them of the new state, and this information is cached and made available for use in those region(s) if the end user is later mapped there. In a variant, the decision about which replica region should be used to obtain a given session state object is based on where an end user request for service originates.

The foregoing has outlined some of the more pertinent features of the present invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF THE PREFERRED EMBODIMENT

The present invention leverages Internet CDN architecture and functionality such as generally described below. Familiarity with Java programming conventions and the J2EE architecture are presumed. Additional information about J2EE is available in the publication titled *Java 2 Platform Enterprise Edition Specification* v1.3 (July 2001), which is available from Sun Microsystems.

By way of background, it is known in the prior art to deliver digital content (e.g., HTTP content, streaming media and applications) using an Internet content delivery network (CDN). A CDN is a network of geographically-distributed content delivery nodes that are arranged for efficient delivery of content on behalf of third party content providers. Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

Figure 1:
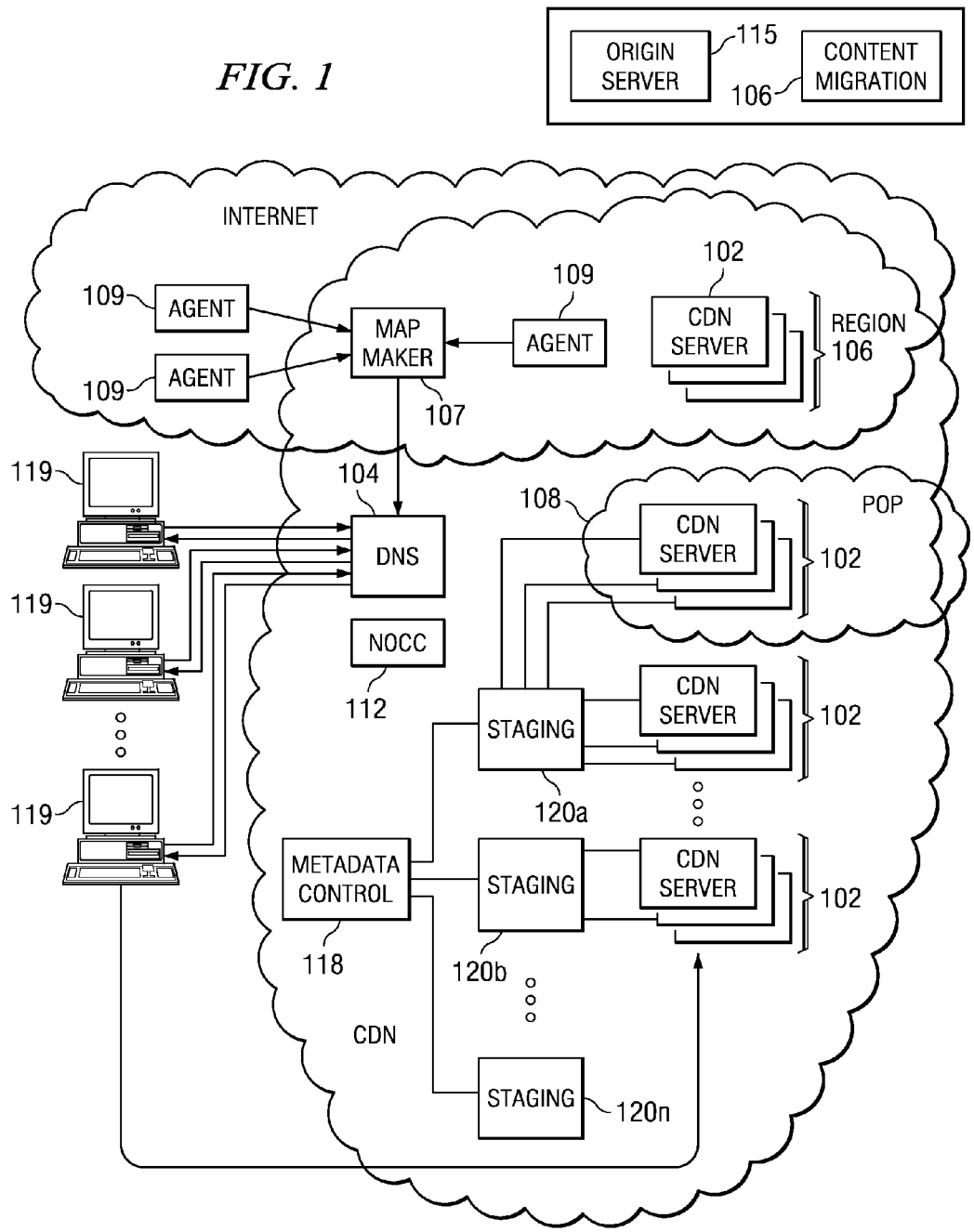
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients. The distribution infrastructure consists of on-demand or push-based mechanisms that move content from the origin server to the surrogates. A CDN service provider (CDNSP) may organize sets of surrogate origin servers as a group or so-called "region." In this type of arrangement, a CDN region 106 typically comprises a set of one or more content servers that share a common back-end network, e.g., a LAN, and that are located at or near an Internet access point. A typical CDN region may be co-located within an Internet Service Provider (ISP) Point of Presence (PoP) 108, although a "region" need not be associated with or imply any geographic association. A representative CDN content server is a Pentium-based caching appliance running an operating system (e.g., Linux-based, Windows NT, Windows 2000) and having suitable RAM and disk storage for CDN applications and content delivery network content (e.g., HTTP content, streaming media and applications). Such content servers are sometimes referred to as "edge"

servers as they are located at or near the so-called outer reach or "edge" of the Internet. An "edge" server need not be associated with or imply any particular geographic association, however. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a content migrator or rewrite tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In either case, the CDNSP may provide object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer code, other control codes, etc.), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. Once an edge server is identified, the browser passes the object request to the server, which applies the metadata supplied from a configuration file or HTTP response headers to determine how the object will be handled.

As also seen in FIG. 1, the CDNSP may operate a metadata transmission system 116 comprising a set of one or more servers to enable metadata to be provided to the CDNSP content servers. The system 116 may comprise at least one control server 118, and one or more staging servers 120*a-n*, each of which is typically an HTTP server (e.g., Apache). Metadata is provided to the control server 118 by the CDNSP or the content provider (e.g., using a secure extranet application) and periodically delivered to the staging servers 120*a-n*. The staging servers deliver the metadata to the CDN content servers as necessary.

Figure 2:
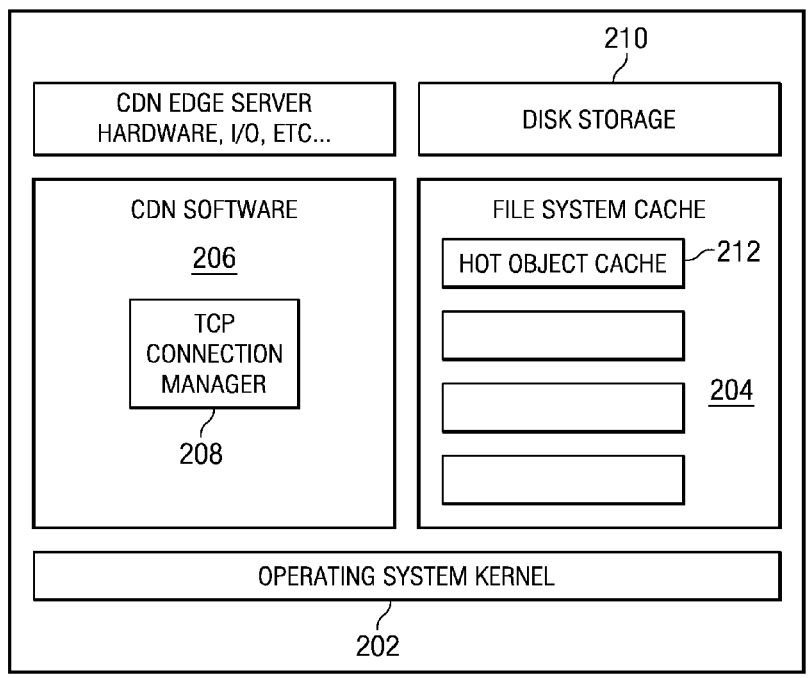
FIG. 2 illustrates a typical machine configuration for a CDN edge server.

FIG. 2 illustrates a typical machine configuration for a CDN edge server. Typically, the content server 200 is a caching appliance running an operating system kernel 202, a file system cache 204, server manager software 206, TCP connection manager 208, and disk storage 210. Server manager software 206, among other things, creates and manages a "hot" object cache 212 for popular objects being served by the CDN. It may also provide other CDN-related functions, such as request routing, in-region load balancing, and the like. In operation as an HTTP cache for example, the content server 200 receives end user requests for content, determines whether the requested object is present in the hot object cache or the disk storage, serves the requested object via HTTP (if it is present) or establishes a connection to another content server or an origin server to attempt to retrieve the requested object upon a cache miss. Typically, the edge server operates in a "pull" manner, wherein an object is pulled into the cache initially upon the first request to the cache—which will generate a cache miss since the object is not present.

The CDN also includes an application framework comprising, for example, at least one region of application server-enabled edge servers. In such case, a given edge server (the machine) such as illustrated above in FIG. 2 also includes application server code. As is well-known, an application server is a software platform (sometimes called middleware) on which applications can be deployed. It provides useful utility services and functions to applications. There are currently several major types of application servers, Java-based (J2EE) and Microsoft .NET. Java, of course, is a programming language and a platform, and the programming language is object-oriented and platform independent. Applications written in Java are translated into Java byte code, which code is then run on (interpreted by) a Java Virtual Machine (JVM). In one embodiment, the present invention takes advantage of given edge servers in the CDN that are provisioned with application server and additional code to enable applications or application components to be executed from the edge of the Internet. The framework can take advantage of and leverage the mapping, load-balancing and management systems used with known CDN offerings, such as the CDN illustrated in FIG. 1 (which is merely representative). In a first embodiment, the application server is a servlet container (e.g., Apache Tomcat), to enable offloading and execution of the Web tier of n-tier Java-based applications. JSP, servlets, Java beans and custom tags, which are executed within an application server's servlet container, are executed at the edge of the Internet, close to the end-user. The Web tier is typically the front end of a J2EE server. In an alternate embodiment, in addition to the Web tier, at least some or all of the Enterprise tier of the application is also deployed to and executed on a given edge server. The Enterprise or "business" tier typically hosts application-specific business logic and provides system-level services such as transaction management, concurrency control, and security. Further details of a preferred Java-based application framework are described in copending, commonly-owned Ser. No. 10/340,206, the disclosure of which is incorporated by reference.

Figure 3:
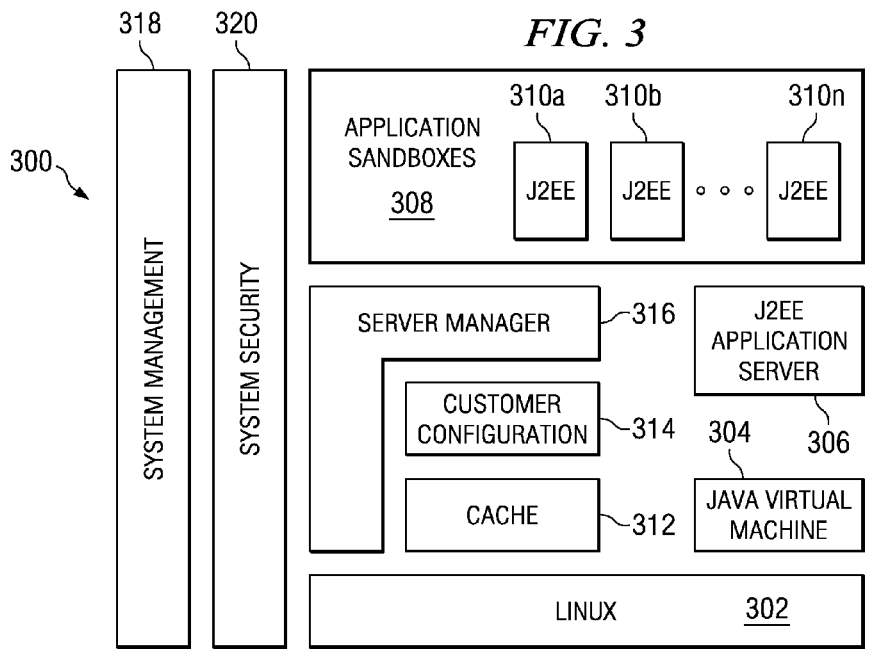
FIG. 3 illustrates a typical machine configuration for a CDN edge server that is provisioned to executed edge-enabled applications or application components.

FIG. 3 illustrates a representative edge server architecture for a CDN server in the edge-enabled application region(s). A given region includes one or more of such servers that are interconnected over a common back-end LAN, as previously described. The server 300 preferably runs on commodity hardware running an operating system (e.g., a modified form of Linux) 302. The Java stack includes a Java Virtual Machine (JVM) 304 and preferably a J2EE-compliant application server 306. For Web tier components, the application server 306 may be implemented with Apache Tomcat servlet container. In particular, a representative Web container is provided by Apache Tomcat servlet container, which uses the JVM in JDK1.3.1_04 available from Sun Microsystems. Of course, these components are merely exemplary and are not meant to be limiting. For Web tier and Enterprise tier components, the application server 306 may be implemented with IBM WebSphere Application Server (WAS), such as Version 5.0 application server (WAS). IBM WebSphere uses JVM (Java Virtual Machine) 1.3.1. These products, of course, are merely exemplary. The framework (preferably the JVM) creates and maintains application sandboxes 308 for each of the applications 310*a-n*. A given customer may run application 310*a*, while another customer runs application 310*b*. Generalizing, the edge server 300 supports multiple discretelyexecutable applications. The edge server 300 implements a cache 312 and maintains customer configuration data 314 that controls when application components are used. The server manager 316 overlays and controls the cache, using the customer configuration data. System management 318 and system security 320 modules are also provided to facilitate these and other functions.

With the above as background, the present invention can now be described. It is assumed that business applications running on the CDN with the above-described application framework can create, access and modify state for each client. Over time, a single client may desire to access a given application on different CDN edge servers within the same region and even across different regions. Each time, the application may need to access the latest "state" of the client even if the state was last modified by an application on a different server. The difficulty arises when a process or a machine that last modified the state dies or is temporarily or permanently unavailable. To provide a concrete example, typically e-commerce sites have implemented shopping carts in the web-tier of the e-business infrastructure architecture. More recently, shopping carts have started being implemented in the Enterprise Java Bean-tier (EJB-tier). Regardless of which tier the shopping cart is implemented in, the problem of sharing state across distributed containers of that tier remains. For illustrative purposes, the following describes implementations of the shopping cart in the web-tier; however, the techniques proposed may be applied, without loss of generality, to the EJB-tier. Of course, the present invention is not limited to implementations of shopping cart functions, as the problem of generating, maintaining, and migrating session state across machines arises with many other types of application components or functionality.

Typically, when a user creates a shopping cart at an e-commerce vendor's site, servlets that implement this functionality create a shopping cart object that, in essence, encapsulates the state of the user session. This shopping cart object usually is embedded within a session object (e.g., an instance of the javax.servlet.http.HttpSession class in Java). As long as the user goes to the same machine that started the session, the management of the shopping cart is relatively straightforward. In a CDN setting, however, the problem of managing the shopping cart is much more complicated. A CDN has little or no knowledge of the need for session-based mapping affinity or for a variety of reasons cannot honor session-based mapping affinity and needs to map the user to a different machine to ensure continuity of the content delivery service. If the shopping cart built by the first machine is not migrated to the second machine, the user loses all the data he/she has put into the shopping cart and in essence has to start from scratch if he or she is mapped to a different machine during a session (which can occur if the user leaves the machine for any amount of time). Migrating the shopping cart involves migrating the session state object after serializing it into a set of bytes and deserializing it at the other end. This assumes that the session object (HttpSession) is serializable.

The solutions outlined below address the problem of migrating the session state within a CDN in a manner transparent to the user.

In-Region Session State Object Caching and Replication

Typically, every session object generated by a web-tier container is uniquely identified within that container via an opaque identifier called a Session Id (SId). In this solution, additional information is associated with this Session Id to make the task of session state migration within a CDN more tractable. In particular, a web-tier container running within a CDN preferably augments the Session Id generated by a native web-tier container to identify precisely who the owner of the session state is within the CDN. As used herein, an "owner" is a given machine, program or process that has control over a given session state object at a given time. In one embodiment, the web-tier container includes appropriate software to generate an augmented Session Id, called a CDN-aware Session Id (CSId). Preferably, the CDN-aware Session ID has several parts—a region number, a session object version number (called a logical time stamp) and the usual SId. The region number represents the region from which the user is currently being served. The version number or logical time stamp is incremented every time the state of the user session is updated, for reasons that will be described below. As noted above, the term region, in the context of a CDN, typically represents a collection of servers (machines) connected to each other via a high-speed local area network and connected to the Internet via a high-bandwidth connection. A CDN, therefore, comprises several regions connected to the Internet and co-operating with each other to ensure the best quality of service to users accessing content via the CDN.

A representative CSId in this embodiment looks as follows:

CSId=<RegionNum>-<LogicalTimeStamp>-<SessionId>

Figure 4:
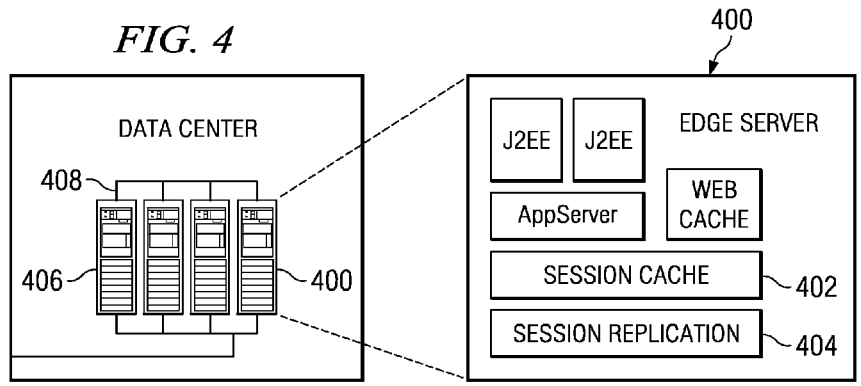
FIG. 4 illustrates a first embodiment according to the present invention for managing session state objects across machines in a CDN region.

According to this embodiment of the invention, a unique CDN-aware session identifier is created and stored in the web-tier container of the machine to which a user is first mapped, and ownership of the session state object migrates to the web-tier container on the machine where the user is then currently mapped. The CSId is also returned to the requesting client. This embodiment of the invention is illustrated in FIG. 4. In particular, a given edge server 400 in the region includes a session cache 402 and a replication mechanism 404. Session cache 402 typically is instantiated and maintained by the web-tier container, but this is not required. Any suitable in-memory or on-disk device may be used. Generally, the session replication mechanism 404 enables the session state object cache 402 in the web-tier container to communicate with other caches (in other web containers on other machines) to fault-in the object if the object is not present in its cache, or to make the object available prospectively (through pre-warming) as will be described.

If, during a session a user is mapped to a second machine 406 and that machine does not have the session state object in its cache, the session state object is made available to the second machine, which then owns the object going forward. Where machines are co-located in the same region such as illustrated in FIG. 4, the second machine (to which the user has been mapped) can obtain the session state object by issuing a broadcast message on the region's LAN backend 408 and waiting for the object to be delivered from the first machine. As an optimization, the "current" owner of a session state object uses its session replication mechanism to broadcast updates to the state object over the LAN 408 so that all servers in the region have the object in their web-tier container cache prospectively.

The following illustrates these operations. Assume that a user gets mapped to a machine in region 10 first where his or her browsing actions create a session object (e.g., the user is logged in or creates a shopping cart). In this example, the CSId generated by the web-tier container on that machine is (by way of example only) 10-1-SId. Assume the user keeps getting mapped to the same machine in the region while he or she selects products from the web site. According to this embodiment of the invention, preferably every update to the shopping cart results in a modification of the session state, which causes the logical time stamp in the CSID representing the session state object to be incremented. In this example, assume that the CSID is now 10-5-SId (as a result of five separate updates). In this example, it is then assumed that the user gets mapped to another machine in the same reason, perhaps for load-balancing reasons (we consider the case of a different region later). Unless prewarming is used, the session state object cache in the web-tier container on the other machine will not have the object in its cache when asked for it by the shopping cart servlets in that container. In this example, the second machine (namely, the replication mechanism) sends a broadcast request to the machines in the region (e.g., over the backend LAN) for the state object. The machine to which the user was first mapped then responds with the session state object. The old machine now ceases to be the owner of the session state object. Ownership of the object migrates to the web-tier container on the machine where the user is currently mapped. As noted above, it may be desirable for the current owner of a session state object to broadcast updates to the state object over the LAN so that all servers in the region have the object in their cache (prewarming). The version number is useful in such case. In particular, if for any reason the broadcast message was lost and the new server has an old copy of the session state object (which it can discover by comparing the logical time stamp of the object requested and the one it has in its cache), then it can broadcast a request for the object on the LAN and wait for the correct response.

If, for some reason the user gets mapped to a machine in a different region, e.g., region 62, then the cache in the web-tier container on that machine will have to send a request for that object (e.g., over the Internet) to the servers in region 10. Servers in region 10 can determine if they have the requested version of the session state object and respond with the appropriate object. At this point, the ownership of the user's session state object migrates to region 62. Preferably, the CSId for the session object changes, e.g., to 62-5-Sid.

In the alternative, it may be desirable (continuing with this example) to have the server in region 62 merely tunnel to an appropriate server in region 10. In this way, region 62 would not have to take ownership of the session and would simply let the server in region 10 continue to maintain ownership of the session.

In general, if mapping changes (from one region to another) within a user's session are rare (which is desirable), the above-described approach works well. The next section outlines a more fault-tolerant solution.

Figure 5:
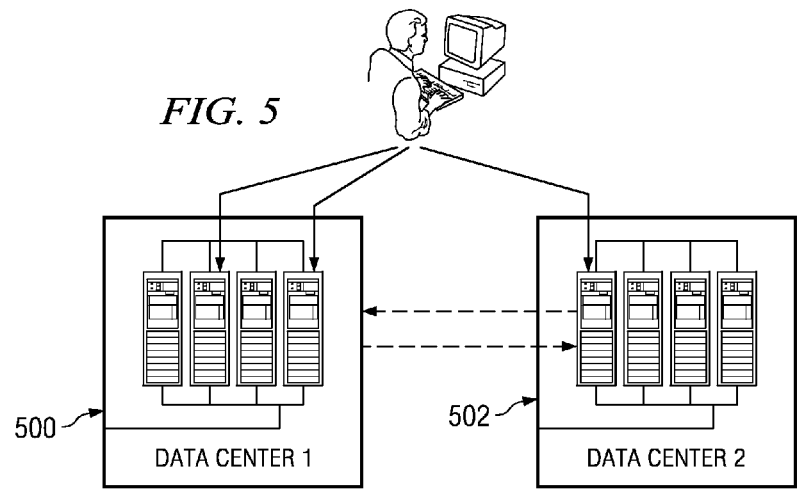
FIG. 5 illustrates a second embodiment according to the present invention for managing session state objects across CDN regions.

Replicating Session State to Other Regions:

Rather than having only one region (e.g., the region where the user is mapped initially) store the session state, in an alternative embodiment the session state is replicated to a set of regions. FIG. 5 illustrates CDN region 500 and CDN region 502, for illustrative purposes. Each CDN region includes a set of one or more CDN edge servers, preferably connected via a backend LAN. Each of the CDN edge servers can broadcast messages over the LAN to the other CDN edge servers in the region.

According to this embodiment, a given CDN region 500 has associated therewith a set of one or more replica regions, such as region 502. The user session state object is available for export from the given CDN region 500 to one or more associated CDN regions such as region 502. A replication mechanism may be used for this purpose.

According to this embodiment, when a user gets mapped to a server in another CDN region, the container in that region preferably has a redundant set of one or more regions from which to obtain the session state. Also, whenever the session state object changes, the web-tier container owning the session state object preferably sends a message to a set of replica regions informing them of the new state. Thus, in this embodiment, changes to the session state object within a particular region are broadcast to one or more other regions, proactively if possible. As in the previous solution, the CSId provides a convenient vehicle for implementation. The following provides an illustration of this operation.

In this embodiment, each region has associated therewith one or more replica regions into which session state objects are made available, preferably on a proactive (prewarm) basis. Without loss of generality, assume that region 10 (of the previous example) is replicated in region 31. Following the example of the previous section, the CSId first generated would be 10-1-SId. As the customer adds more data to his or her shopping cart, preferably the logical time stamp gets incremented as has been described. Moreover, after each modification to the session state, the session object is sent over to region 31 in a short message (via a reliable transport). In this example, say after 5 additions, the CSId becomes 10-5-Sid. Now, at this point, assume that the user gets mapped to region 62. Because the set of replica regions for a region preferably is static (in this example), region 62 knows it can get the session state object for the user either from region 10 or region 31. Thus, the replication mechanism at the applicable server sends out a request to the two regions and waits for the first one to respond with the correct answer. Now, assume that region 10 is dead and region 62 is forced to get the session state from region 31. Knowledge of the version number of the latest state enables the replication mechanism in region 31 to determine whether the session state in region 31 is fresh or stale. If it is proactive, region 62 (in this example) would already have the session object, e.g., because region 10 pushed the object to it.

As noted above, the messaging between the various regions (either to replicate or to migrate ownership) preferably takes place over IP or over a more reliable transport mechanism than traditionally-routed IP. Transport may take place over secure (e.g., encrypted) links. To increase network fault-tolerance, the number of replica regions can be increased to more than one region, although this is not a requirement.

In this example, the replica region is associated with a particular region statically. In a variation, the replica region is selected as a function of where the end user request originates. The next section presents this solution.

Use of Mapping Data to Pick the Replica Regions:

This solution makes use of CDN mapping information to determine a set of regions that act as replicas for a user's session state. Typically, there are many sources of such information that may be used by the CDN to evaluate Internet traffic conditions and congestion. Thus, for example, the CDN service provider may use various sources of information to analyze the network including, without limitation: topological measurements (iBGP feeds) from networks in which CDN edge servers reside, traceroutes and other measurements to determine the overall connectivity of the Internet, latency and packet loss information from reference points on the Internet, DNS information, health of key transit regions of the Internet, and observed routing decisions. The information is collected in a distributed manner, and distributed mapping techniques determine an optimal "map" of end-user IP blocks to data centers that host CDN regions. Such maps are useful in associating a given end user client request to a particular CDN edge region.

The use of mapping information to pick the replica regions increases the chance that the session state object will be found in the cache of the new server (after a mapping change).

In this solution, the CSId may have the following illustrative form:

CSId=<MapGroupId>-<LogicalTimeStamp>-<SessionId>

In this example, the MapGroupId is a "unit-of-mapping" identifier that uniquely identifies the user for mapping purposes. Preferably, mapping decisions for the user are made based on the end user's "MapGroupId". The CDN may map based on the name server's MapGroupId, but a simplifying assumption is that this is the same as the user's MapGroupId. In this variant, the selection of the set of replica regions is a function of the user's MapGroupId. Because a user typically is mapped to a relatively static set of regions over the course of a day, it should be possible for the CDN to pre-warm those replicas with the session state information. This would dramatically increase the chances that the session state object would be already available right in the region to which the user has been mapped. Following the example described earlier, the assumption is that, a priori, the user will be mapped either to region 10 or region 62. Because (in this example) region 62 is in a predetermined set of region replicas, the session state object is sent out via a message to region 62 every time it is updated.

The above solution provides increase in fault-tolerance and performance.

Integration with the Origin Site:

According to the invention, it is also desirable to provide a mechanism to make the edge side session state objects available to servlets and other web-tier objects resident in the origin site's web-tier containers. To illustrate the problem via an example, assume that the user has built up his/her shopping cart on an edge server and is ready to make a purchase. If this purchase is directed to the origin site (which will be the case for a transaction typically), then the servlet(s) at the origin site will need to have the shopping cart available to them. The present invention provides a mechanism to transfer, transparently, the session state object from the CDN edge server to the session state object cache at the origin. This section outlines a solution to this problem.

Figure 6:
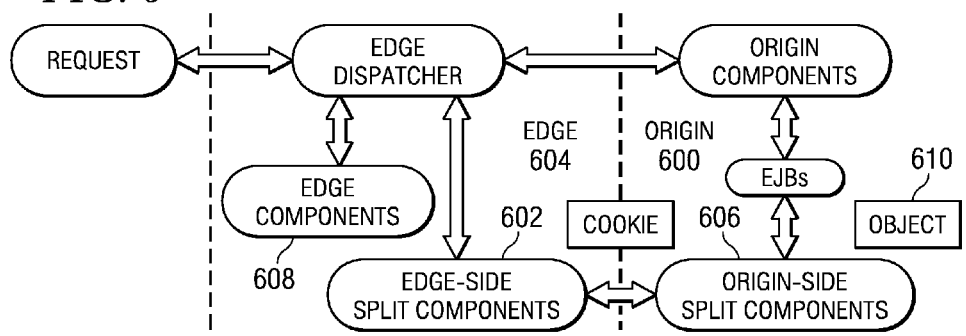
FIG. 6 illustrates another aspect of the present invention, wherein user session state is exported from an edge server to an origin server.

As illustrated in FIG. 6, for a given servlet to be hosted at the origin site 600, the servlet is split into two parts—a "client-side" (or edge-side) stub 602 that runs on the edge server 604, and a "server-side" stub 606 that provides the desired functionality. If the servlet is to run at the origin 600, the web-tier container 608 at the edge tunnels the servlet request to the origin site, which tunnels the response back. For origin servlets that rely on session state, the "client-side" servlet stub 602 serializes the session state into a data structure such as a cookie, modifies the request, and tunnels the request to the "server-side" 606. This serves to export the session state from the edge side of the application to the server side of the application. The server-side stub 606 then reads the cookie, deserializes the cookie into a session state object 610, and then invokes the actual servlet. After the servlet invocation, the session state is once again serialized and sent back to the "client-side" servlet stub, preferably as a cookie. When the cookie reaches the edge (client-side), it is deserialized into a session state object and managed in exactly the same way as described in the previous sections.

Thus, in a preferred embodiment, communication of session state between edge machines and the origin site preferably takes place using cookies. If increased bandwidth and CPU usage (e.g., due to encryption of the cookie) are undesirable, these limitations may be mitigated to some extent by applying a difference-based compression of the cookie. The advantage of this approach is that it does not require modification to the customer site, and it does not require the customer to run any extra (e.g., CDN-provided) software at their site. Also, in most workflows (such as a shopping cart), the use of origin servlets will be minimal (typically to process the purchase of items in the shopping cart). As a result, round trips (between the edge and the origin) that contain session state information in cookies is expected to be minimal. Of course, if the session were to be resident entirely at the edge, then session state invalidation may take place at the edge and the issue of migrating the session state to the origin site does not arise.

Summarizing, the client-side stub running on the edge serializes the state into a cookie, which is then sent to the origin site, where the server stub deserializes the state from the cookie and sets up the state before invoking the actual servlet (which is resident at the origin). After the origin servlet completes execution, the modified session state is once again transported to the edge, preferably as a cookie.

Using the above-described technique, session state is managed in the edge web-tier container, but synchronized to the origin. As used herein, the term synchronized to the origin means that a master state is kept on the origin. Synchronized "with" the origin means that session state is synchronized between servlets/JSPs running on the edge and at the origin. In one embodiment, the origin runs a servlet (a synchronization servlet) that is responsible for: receiving updates to session state; persistently storing updates to session state (e.g., in an associated database), and, providing the edge server (the client stub) with the current session state if an edge servlet needs session state but such state is not cached. The synchronization servlet can be run at the customer's origin site or, alternatively, at a CDN-managed "virtual origin" session synchronization cluster. For running on the origin, the synchronization servlet must support common application servers (IBM WebSphere, BEA WebLogic, or other Servlet 2.2 compliant servlet engines), and common databases (Oracle, DB2, or the like), if a database is used for synchronization. If the origin itself does not need access to session information, e.g., if the entire Web layer of the application runs on the edge, then the synchronization servlet preferably runs on the CDN, e.g., on a distributed replicated session synchronization cluster. Although this design refers to the "synchronization servlet," an alternative way to communicate between the edge and the origin would be over the JMS message protocol.

Preferably, the application server running on the edge is modified to support synchronization to the origin. The following solution does not involve changing the format of the session cookie to include version number, region number, or any other information. It works as follows:

When a request is received by a given first edge server, the session is created on the edge. Assume the session id is 11111. The user receives a cookie with session id 11111, or all URLs are encoded in a corresponding way. Whenever the session state is modified, an update is sent to the origin. Now, suppose the user gets remapped to a second edge server), e.g., because of changing load conditions or because the first edge server has failed. When the request comes in to the second edge server, that edge server evaluates whether it has the state for session 11111 in its cache. If not, the second edge server contacts the origin to get the session state for session 11111. Thereafter, the second edge server changes the current session id for this session to a new number, e.g., 22222. Without this operation, a request bouncing back to the first edge server would be in danger of reusing the old state. Thus, instead of creating version numbers, this alternative approach creates a new session id for the same session. Note that session state should remember all the session ids under which the session has ever been known (11111 and 22222) in this case. Otherwise, there may be a situation when an end user tries to access the new session using the old session id (11111), which might occur when URL-encoding is used.

There are several ways to send a session update to the origin: synchronous and asynchronous. With a synchronous update, the servlet/JSP does not return to the end user until it is confirmed that the update has been received. This operation invokes a roundtrip delay on every write to session state. The asynchronous update does not block the servlet/JSP from returning to the end user, which is more efficient.

Changes to the Web Container:

A web-tier container needs some modifications to be able to support the storing of session state on the edge in a CDN. The most important change is a way to register a plug-in that appends CDN related information to the Session Id that the container generates. It may be implemented in the Web tier code natively or it may be implemented via an application programming interface that the edge-enabled web-tier container support. The Web container must also include or implement (e.g., from existing resources) a network-enabled session state object cache that communicates with caches in the other servers in the CDN. Web-tier containers will either have to provide a CDN-aware session object cache or provide a mechanism for such a cache to be plugged in to the web-tier container over-riding a default cache. As also described above, the present invention leverages any known or later-developed transport mechanism to achieve the replication of session state objects. A reliable, quick and inexpensive transport mechanism is desired. One such technique is using intermediate CDN nodes as way points, as described in copending application Ser. No. 10/087,033, filed Mar. 1, 2002. That technique is implemented commercially as SureRoute$^{SM}$, from Akamai Technologies, Inc. of Cambridge, Mass. In such case, the session state objects being sent to the replica regions may be sent over a transport mechanism such as described in that application so that the chances of such objects getting to the destination region are higher than merely sending them over traditionally-routed IP networks (the current Internet). The actual transport mechanism is not part of the present invention, however.

The specification describes ways in which a web-tier container can be augmented to support user sessions in a CDN setting. This is achieved by replicating session state across a set of replica regions and extending the addressing of the session state object to determine from where to fault-in session state.

One of ordinary skill will recognize that many variants are within the scope of the present invention. Thus, for example, in the first embodiment described above it may not be necessary to create a new augmented Session Id because the region number and the version number may be propagated to the client as cookies if the client has enabled cookies. For clients that have not enabled cookies, however, a CSId would be required when the URLs presented to the client were re-written. As is well-known, URL-rewriting is a standard way to send cookie-like information to the browser if the browser has disallowed cookies. The CDN-aware session identifier CDId may be secured, e.g., by a suitable encryption key, prior to being transferred across a region or across regions. Moreover, while in the preferred embodiment as described above the user session state is stored in a cache associated with or implemented by a Web-tier container, the present invention may also be implemented in or associated with an Enterprise-tier container if that container is instantiated on the edge servers. Thus, the present invention envisions the use of a session state cache in an edge server having, in general, a runtime support container, application server code, and at least one platform-independent codebase (an application, an application component, a process, or the like).

There is no requirement that a particular application have components that execute on both the edge and the origin; indeed, a given application may execute in a standalone manner completely as an edge-enabled application. There is no requirement that application components be loaded only in response to client requests at a particular edge server. Indeed, in many cases it will be desirable to pre-deploy an application or an application component based on some prediction of expected future need for that application or component, or for purposes of fault tolerance. Thus, a given application or component thereof may be delivered to a particular edge server and initialized and started irrespective of whether an end user request has been received at the server. Also, there is no requirement that application components be fully or partially J2EE-compliant, or even that the subject matter be implemented entirely in Java. Indeed, the present invention is also extensible beyond Java and J2EE. In particular, the inventive concepts may be practiced in any platform-independent application server programming environment (e.g., Microsoft .NET, Mod Perl executing in Apache, Zope, or the like) capable of being deployed in a distributed computing environment such as a content delivery network.

Having described our invention, what we claim is as follows.

The invention claimed is:

1. A method of managing user session state during execution of platform-independent code in a content delivery network (CDN) deployed and operated by a service provider, the content delivery network comprising a set of edge server regions organized into distinct and separate regions and a DNS-based request handling mechanism for mapping DNS queries to the edge servers, each edge server region comprising a set of edge servers, and at least some of the edge servers in the CDN provisioned with a runtime container and application server code for executing the platform-independent code, comprising:

at a first edge server, establishing a user session state object in association with the execution of a client side component of the platform-independent code at the first edge server;

transferring the user session state object from the first edge server to a server side component of the platform-independent code, the server side component of the platform-independent code located remotely from the first edge server;

receiving, from the server side component of the platform-independent code, a result generated by executing the server side component of the platform-independent code using the user session state object transferred from the first edge server;

associating at least a second edge server to the first edge server to receive and store the user session state object; and replicating the user session state object to the second edge server, wherein, as a result of the replicating step, the user session state object is available to the platform-independent code on the second edge server if the CDN DNS-based request handling mechanism maps a given DNS query associated with the execution of the platform-independent code to the second edge server.

2. The method as described in claim 1 wherein the server side component of the platform-independent code is associated with an origin server.

3. The method as described in claim 1 wherein the server side component of the platform-independent code is associated with a virtual origin server operated by the service provider.

4. The method as described in claim 1 wherein the user session state object is associated with a shopping cart and the user session state is transferred in association with a checkout function.

5. The method as described in claim 1 wherein the user session state object is transferred from the first edge server to the server side component synchronously or asynchronously.

6. The method as described in claim 1 wherein the first edge server and the second edge server are co-located.

7. The method as described in claim 1 wherein the first edge server is located in a first CDN region and the second edge server is located in a second CDN region remote from the first CDN region.

8. The method as described in claim 1 wherein the user session state is associated with a data structure.

9. The method as described in claim 8 wherein the data structure comprises a region number, and a session state identifier.

10. The method as described in claim 8 wherein the data structure also includes a session state version number that is incremented upon an update to the user session state.

* * * * *